United States Patent [19]
Frick

[11] Patent Number: 4,481,967
[45] Date of Patent: Nov. 13, 1984

[54] CONTROL CIRCUIT FOR CURRENT TO PRESSURE CONVERTER

[75] Inventor: Roger L. Frick, Eden Prairie, Minn.

[73] Assignee: Rosemount Inc., Eden Prairie, Minn.

[21] Appl. No.: 352,312

[22] Filed: Feb. 25, 1982

Related U.S. Application Data

[63] Continuation of Ser. No. 94,444, Nov. 15, 1979, abandoned.

[51] Int. Cl.$^3$ ............................................. G05D 16/00
[52] U.S. Cl. ..................................... 137/85; 137/487.5
[58] Field of Search ...................... 137/84, 85, 625.04, 137/625.06, 486, 487.5

[56] References Cited

U.S. PATENT DOCUMENTS

| | | | |
|---|---|---|---|
| 2,842,147 | 7/1958 | Markson | 137/85 |
| 2,914,076 | 11/1959 | Zimmerli | 137/82 |
| 2,928,409 | 3/1960 | Johnson et al. | 137/82 |
| 2,939,430 | 6/1960 | Westbury | 91/363 |
| 2,941,723 | 6/1960 | Severns | 236/84 |
| 2,993,497 | 7/1961 | Coles et al. | 137/85 |
| 3,063,422 | 11/1962 | Gregowski et al. | 121/38 |
| 3,113,582 | 12/1963 | Hudson | 137/115 |
| 3,134,425 | 5/1964 | Oppenheimer et al. | 158/99 |
| 3,390,694 | 7/1968 | Rouvalis | 137/85 |
| 3,456,669 | 7/1969 | Lloyd | 137/84 |

OTHER PUBLICATIONS

Fisher Control Company, Bulletin 13.1:546, "Type 546 Electro–Pneumatic Transducer", May 1965.
Foxboro Company, Bulletin T131-125a, "E69 Series Current-to-Pneumatic Converters and Positioner".

*Primary Examiner*—Martin P. Schwadron
*Assistant Examiner*—John A. Rivell
*Attorney, Agent, or Firm*—Kinney & Lange

[57] ABSTRACT

A current-to-pressure converter receives an electrical input signal, such as a DC current, which is a function of a sensed parameter and which is indicative of a desired output pressure. An electrical-to-pressure transducer provides an output fluid pressure as a function of an electrical control signal. A function of the output pressure is sensed by a sensor which provides an electrical feedback signal which is a function of such pressure. The feedback signal is compared to a command signal derived from the electrical input signal. When a change in the sensed parameter occurs, the electrical input signal changes, which in turn results in a change in the command signal. The electrical control signal changes, thereby changing the output pressure until the feedback signal has changed sufficiently to return the command signal and feedback signal to a balanced state.

14 Claims, 6 Drawing Figures

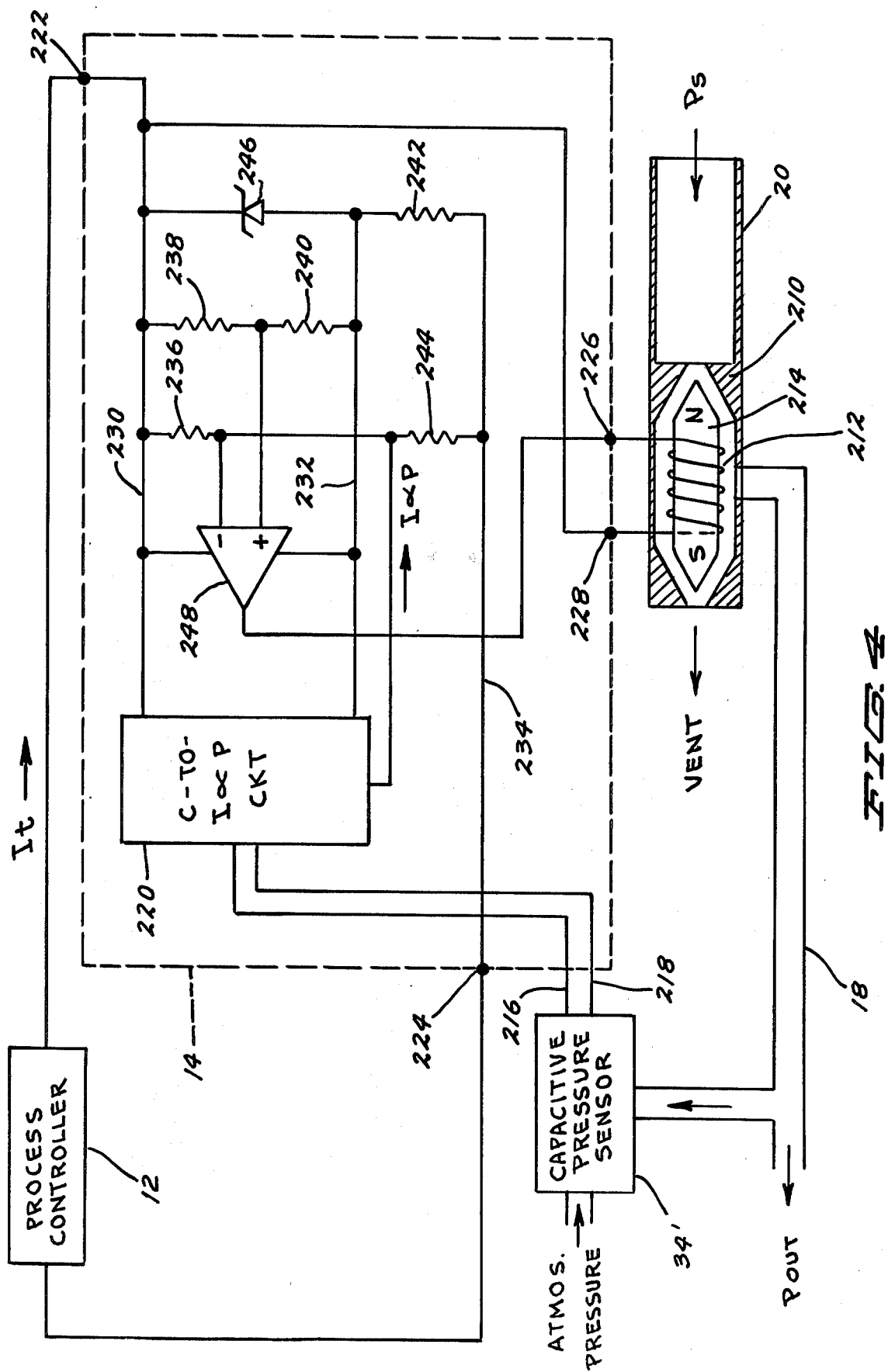

CONTROL CIRCUIT FOR CURRENT TO PRESSURE CONVERTER

This is a continuation of application Ser. No. 94,444, filed Nov. 15, 1979 now abandoned.

REFERENCE TO CO-PENDING APPLICATION

Reference is made to a co-pending application Ser. No. 094,443, entitled "Current to Pressure Converter Apparatus" which was filed on even date with this application and is assigned to the same assignee.

BACKGROUND OF THE INVENTION

1. Field of the Invention

The present invention relates to current-to-pressure converter apparatus.

2. Description of the Prior Art

Various electro-pneumatic transducers which convert an electrical signal into a pressure signal for controlling valves and the like have been used in the prior art. For example, Fischer Controls of Marshalltown, Iowa makes several models, typical of which is the Type 456 Electro Pneumatic Transducer. These devices utilize an armature for controlling a fluid flow, and which fluid flow in turn operates a feedback diaphragm controlling the bleed of a supply of fluid under pressure in atmosphere.

Another type of device which operates on a similar principle, but which uses mechanical feedback is called the E69 Series Current Pneumatic Converter Positioner made by the Foxboro Company of Foxboro, Mass.

Electrical feedback arrangements have also been used in some prior art electro-pneumatic transducers. Examples of these prior art devices are shown in U.S. Pat. Nos. 2,914,076; 2,930,430; and 2,941,723.

Other examples of control apparatus using fluid pressure signals are shown in U.S. Pat. Nos. 2,928,409; 3,063,422; 3,134,425; and 3,456,669. In particular, U.S. Pat. Nos. 3,063,422 and 3,456,669 show piezoelectric elements used as flappers to control pressure outflow from nozzles.

SUMMARY OF THE INVENTION

The present invention is a control apparatus which converts electrical signals to a fluid pressure output which may be used to control a valve or similarly controlled device. The control apparatus receives an electrical input signal which is a function of a sensed parameter relating to a process which is being controlled by the control apparatus. Electrical-to-pressure transducer means provides the fluid pressure output as a function of an electrical control signal. A function of the fluid output pressure provided by the electrical-to-pressure transducer means is sensed by means for providing a feedback signal which is a function of such fluid pressure. This feedback signal is compared with a command signal which is a function of the electrical input signal. The electrical control signal supplied to the electrical-to-pressure transducer means is a function of the comparison of the command signal and the feedback signal.

BRIEF DESCRIPTION OF THE DRAWINGS

FIG. 4 is an electrical schematic diagram of an alternative control apparatus for use in the current-to-pressure converter of the present invention.

DETAILED DESCRIPTION OF THE PREFERRED EMBODIMENTS

Figure 1:
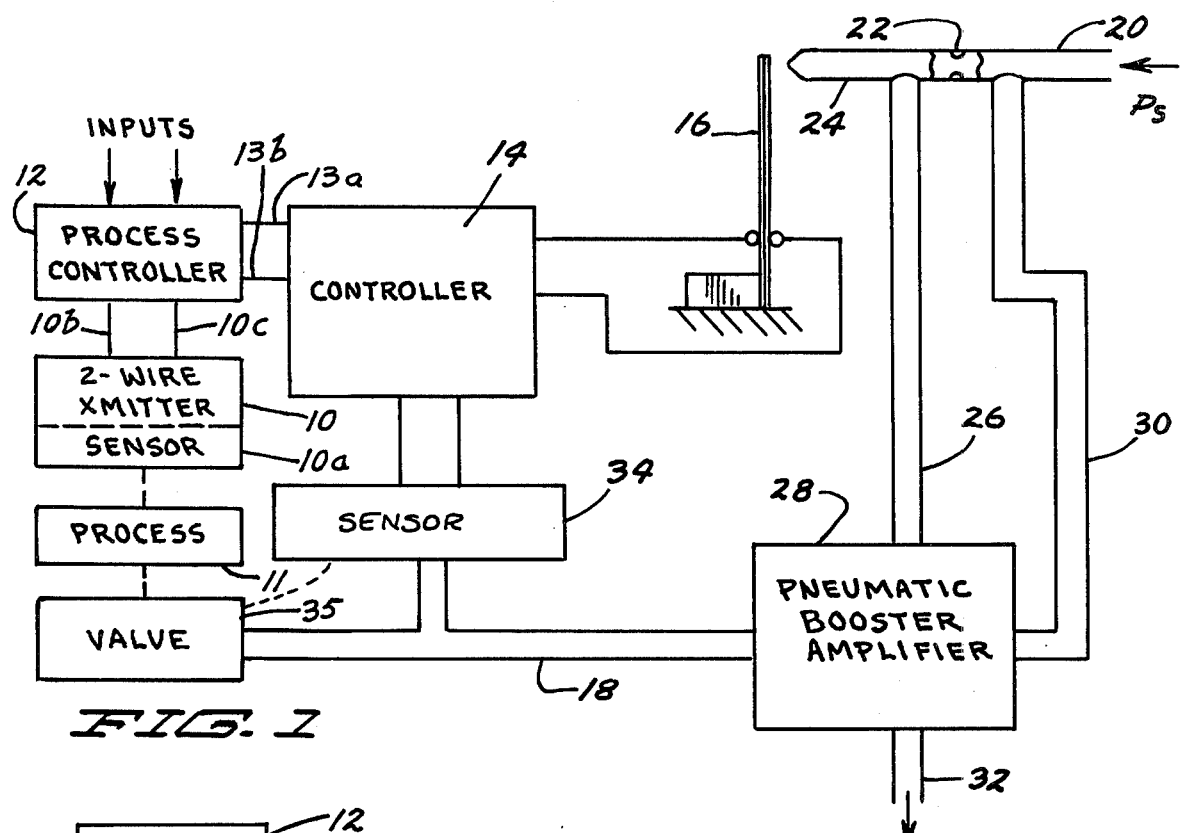
FIG. 1 is a schematic representation of a current-to-pressure converter made according to the present invention.

The Apparatus of FIG. 1

FIG. 1 shows, in block diagram, a preferred embodiment of the current-to-pressure converter of the present invention. As shown in FIG. 1, the apparatus includes two-wire DC transmitter 10, which includes a sensor 10a for sensing a parameter (such as pressure or temperature) associated with operation of a process 11. The two-wire transmitter 10 supplies a signal via wires 10b and 10c to process controller 12, which is typically located in a control room. Based upon the signal from two-wire transmitter 10 and any inputs (which may, for example, be operator and/or computed signals), process controller 12 supplies an electrical input signal via wires 13a and 13b to two-wire electronic controller 14. In one preferred embodiment, this electrical input signal is a DC current in the range of 4–20 milliamps. The output of controller 14 is an electrical signal which drives piezoelectric bimorph 16. The amount of movement of bimorph 16 is a function of the amplitude of the electrical drive signal supplied by electronic controller 14.

Bimorph 16 is formed of two piezoelectric plates which are then cemented together with an insulator type cement. The plates are oriented such that an applied voltage across the two piezoelectric plates causes one plate to expand and the other to contract. Bimorph 16, therefore, moves or bends proportional to the applied voltage. The fluid pressure in a pressure line 18 may be controlled by means of bimorph 16. A supply pressure $P_S$ is supplied in input line 20. The pressure is supplied through orifice 22 in line 20 to nozzle 24, which is positioned proximate the end of bimorph 16. The amount of fluid pressure escaping through nozzle 24 is a function of the position of bimorph 16. This nozzle pressure is fed through line 26 to pneumatic booster amplifier 28, which is preferably a spool valve type booster amplifier, as described in detail in the previously mentioned co-pending application. Input pressure received through line 20 is also supplied through line 30 to pneumatic booster amplifier 28. The output port of amplifier 28 is connected to output line 18, which carries the output pressure for controlling a valve, or some other control device. Amplifier 28 also includes an exhaust port 32 shown in FIG. 1.

The pressure in pressure line 18 controls operation of valve 35, which in turn effects the operation of process 11. The apparatus shown in FIG. 1, therefore, provides closed loop control for process 11.

In the preferred embodiments of the present invention, two-wire transmitter 10 is a device of the type which senses a parameter, and in which the total DC current flowing through the two wires 10b and 10c of transmitter 10 is a function of the sensed parameter. In one embodiment, transmitter 10 is of the type described in U.S. Pat. No. 3,646,538 by Roger L. Frick, in which the sensed parameter is pressure.

As shown in FIG. 1, the DC current input signal supplied by process controller 12 to two-wire electronic controller 14 constitutes the entire electrical power for energizing controller 14, electrical pressure sensor 34, and bimorph 16. A DC command signal is derived from the DC current and is used to control the output pressure in pressure line 18.

As shown in FIG. 1, electrical sensor 34 is connected to electrical controller 14. Sensor 34 senses the output pressure in line 18 or, alternatively valve 35 position as shown by the dotted line between sensor 34 and valve 35. In a preferred embodiment, sensor 34 is a piezoresistive bridge type pressure sensor or strain gage and, alternatively when a position sensor is used, the sensor is a LVDT, potentiometer strain gage, synchro or other position encoding device, which is connected to electronic controller 14 and provides a DC feedback signal. As pressure in line 18 varies or the position of valve 35 varies, the resistances of the piezoresistive bridge or the position sensor signal vary which causes a DC feedback signal to vary. Electronic controller 14 controls the output voltage applied to bimorph 16, and thereby the output pressure in line 18 as a function of a comparison of the DC command signal and the DC feedback signal.

The output pressure in line 18, therefore, is controlled by electronic controller 14 as a function of the input DC current from process controller 12 and the pressure or position sensed by sensor 34. In one preferred embodiment, process controller 12 provides an input DC current $I_t$ which varies between four and twenty milliamperes. An increase in DC current $I_t$ from process controller 12 as a result of a change in the parameter being sensed by transmitter 10 results in a departure from electrical balance between the DC command signal and the DC feedback signal, which in turn results in an increase in the voltage applied to bimorph 16 and an increase in the pressure in line 26 being supplied to pneumatic amplifier 28. The output pressure in line 18, therefore, increases and sensor 34 changes its resistance. The DC feedback signal changes (and the voltage applied to bimorph 16 continues to change) until a new balance between the DC feedback and DC command signals is attained. At the new balance the voltage applied to bimorph 16 remains constant and bimorph 16 has attained a new rest position. As long as there is no leak or usage of the pressure fluid in line 18, the output pressure $P_{OUT}$ remains constant at the level which it had when balance was attained. When a deviation from balance occurs (due to a change in either the DC command signal or the DC feedback signal), the control voltage again changes until balance is again attained.

Figure 2:
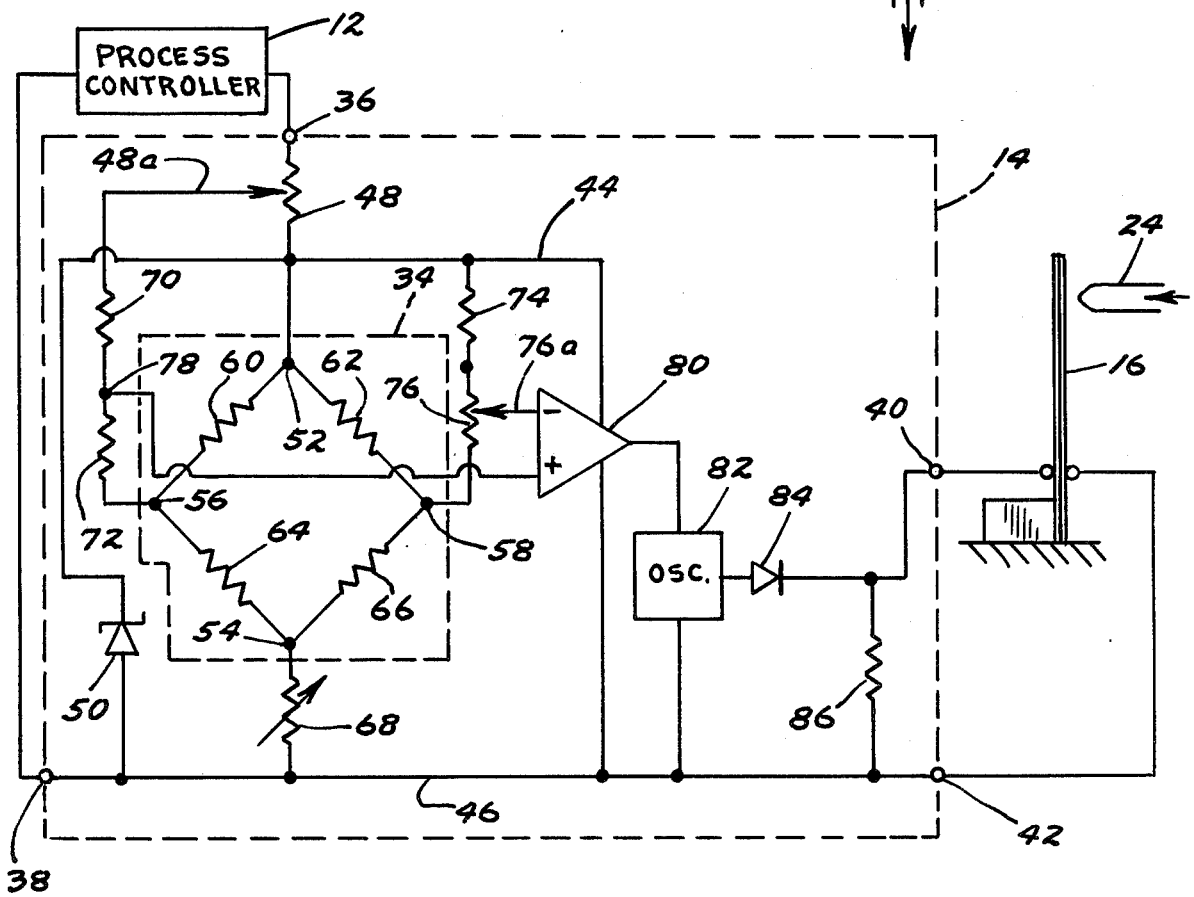
FIG. 2 is an electrical schematic diagram of an electrical control apparatus utilized in one preferred embodiment of the current-to-pressure converter of FIG. 1.

The Apparatus of FIG. 2

FIG. 2 shows a schematic diagram of one successful embodiment of the present invention. As shown in FIG. 2, electronic controller 14 has first and second input terminals 36 and 38 which are connected in a series conduction path with process controller 12. Output terminals 40 and 42 of controller 14 are connected to bimorph element 16.

Controller 14 has first and second main conductors 44 and 46, between which most of the electrical circuitry of controller 14 is connected. Input terminal 36 is connected through potentiometer 48 to first conductor 44. Input terminal 38 and output terminal 42 are both connected to second conductor 46.

The voltage between conductors 44 and 46 is regulated by voltage regulating means, which in the embodiment shown in FIG. 2 is Zener diode 50. The cathode of Zener diode 50 is connected to first conductor 44, and the anode of Zener diode 50 is connected to second conductor 46. Also connected between conductors 44 and 46 is pressure sensor 34, which is a piezoresistive bridge type sensor having four terminals 52, 54, 56 and 58 and four stress sensitive resistors 60, 62, 64 and 66. First bridge terminal 52 is connected to first conductor 44, and second bridge terminal 54 is connected through variable temperature compensating resistor 68 to second conductor 46. Resistor 60 is connected between first and third bridge terminals 52 and 56; resistor 62 is connected between the first and fourth bridge terminals 52 and 58; resistor 64 is connected between second and third bridge terminals 54 and 56; and resistor 66 is connected between second and fourth bridge terminals 54 and 58.

Resistor 48 is a span adjusting potentiometer. Wiper arm 48a of potentiometer 48 is connected through resistors 70 and 72 to second bridge termninal 50 of sensor 34. Fourth bridge terminal 58 is connected to first conductor 44 through resistor 74 and zero adjusting potentiometer 76.

The DC feedback and DC command signals are derived from wiper arm 76a of potentiometer 78 and from circuit node 78, which is the junction between resistors 70 and 72, respectively. Wiper arm 76a is connected to the inverting input of error amplifier 80, while node 78 is connected to the non-inverting input of amplifier 80. First and second conductors 44 and 46 are also connected to amplifier 80 to provide power.

The output of amplifier 80 is a DC signal which is indicative of the electrical balance between the DC command and feedback signals. Amplifier 80 is an error amplifier and will slew if there is a difference between its inverting and non-inverting inputs. The direction of slew depends on which of the two inputs (i.e. the DC command or DC feedback signal) is higher. This DC signal is supplied to a DC-to-DC converter formed by oscillator 82, rectifier 84, and resistor 80. Oscillator 82 provides an alternating current output having an amplitude which is a function of the DC signal. The output of oscillator 82 is rectified by rectifier 84 and is supplied through output terminals 40 and 42 to bimorph 16. Resistor 86 which is connected across output terminals 40 and 42, permits discharging of the bimorph as voltage is removed from bimorph 16.

In normal operation, a steady state relation is achieved in which the DC command signal and DC feedback signal inputs to amplifier 80 are essentially balanced. When two-wire transmitter 10 senses a change in parameter, such as pressure or temperature, the signal supplied by transmitter 10 to process controller 12 changes. As a result, current $I_t$ supplied by process controller 12 is changed. For example, an increase in current $I_t$ to input terminal 36 results in an increase or rise in the voltage at node 78. This causes the voltage at the non-inverting input of amplifier 80 to rise with respect to the voltage at the inverting input. This in turn causes a rise in the output of amplifier 80, which in turn causes an increase in the output voltage supplied by oscillator 82. This increased voltage causes bimorph 18 to bend further toward nozzle 24, thereby increasing the back pressure in line 26 shown in FIG. 1. This results in an increased output pressure in line 18.

Piezoresistive sensor bridge 34 senses the increased pressure and the resistances of all four resistors 60, 62, 64 and 66 change as a function of pressure. As a result, an increase in pressure results in a rise in the voltage at potentiometer wiper 76 (and the inverting input of amplifier 80). The pressure in output line 18 continues to rise, and the voltage at the inverting input of amplifier 80 changes until balance is again restored between the two inputs to amplifier 80. As balance is again attained, the supply voltage from amplifier 80 to oscillator 82 remains at a new value and the voltage to bimorph 16 remains at a new value as long as balance continues.

Similarly, when a decrease in $I_t$ occurs due to a change in the parameter sensed by two-wire transmitter 10, the voltage falls at node 78 (and the non-inverting input of amplifier 80). As the resulting output pressure in output line 16 decreases, the resistances of bridge resistors 60, 62, 64 and 66 change such that the voltage at wiper blade 76a (and the inverting input of amplifier 80) decreases until balance is again achieved. Once balance has been achieved, the output of amplifier 80, and therefore the voltage to bimorph 16, remains constant until another change in $I_t$ occurs.

In the embodiment shown in FIG. 2, potentiometer 48 provides a span adjustment of the circuitry while potentiometer 76 provides a zero adjustment. In addition to these two adjustments, temperature compensation is achieved by variable resistors 68. The need for temperature compensation results from the temperature sensitivy or piezoresistive sensor bridge 34. The zero adjustment provided by potentiometer 76 adjusts for both the zero offset due to sensor 34 and zero offset due to amplifier 80. This simplifies adjustments of the circuit, since only a single zero adjustment is required.

With the apparatus of the present invention, as illustrated in the Figures, accurate control of output pressure is achieved. Piezoelectric bimorph element 16 is low in cost, is small in physical size, and has extremely low power consumption and low shock and vibration sensitivity. Although bimorph element 16 may not accurately transform voltage at output terminals 40 and 42 to motion, the DC feedback signal provided by pressure sensitive bridge 34 permits compensation for these errors.

Figure 3A:
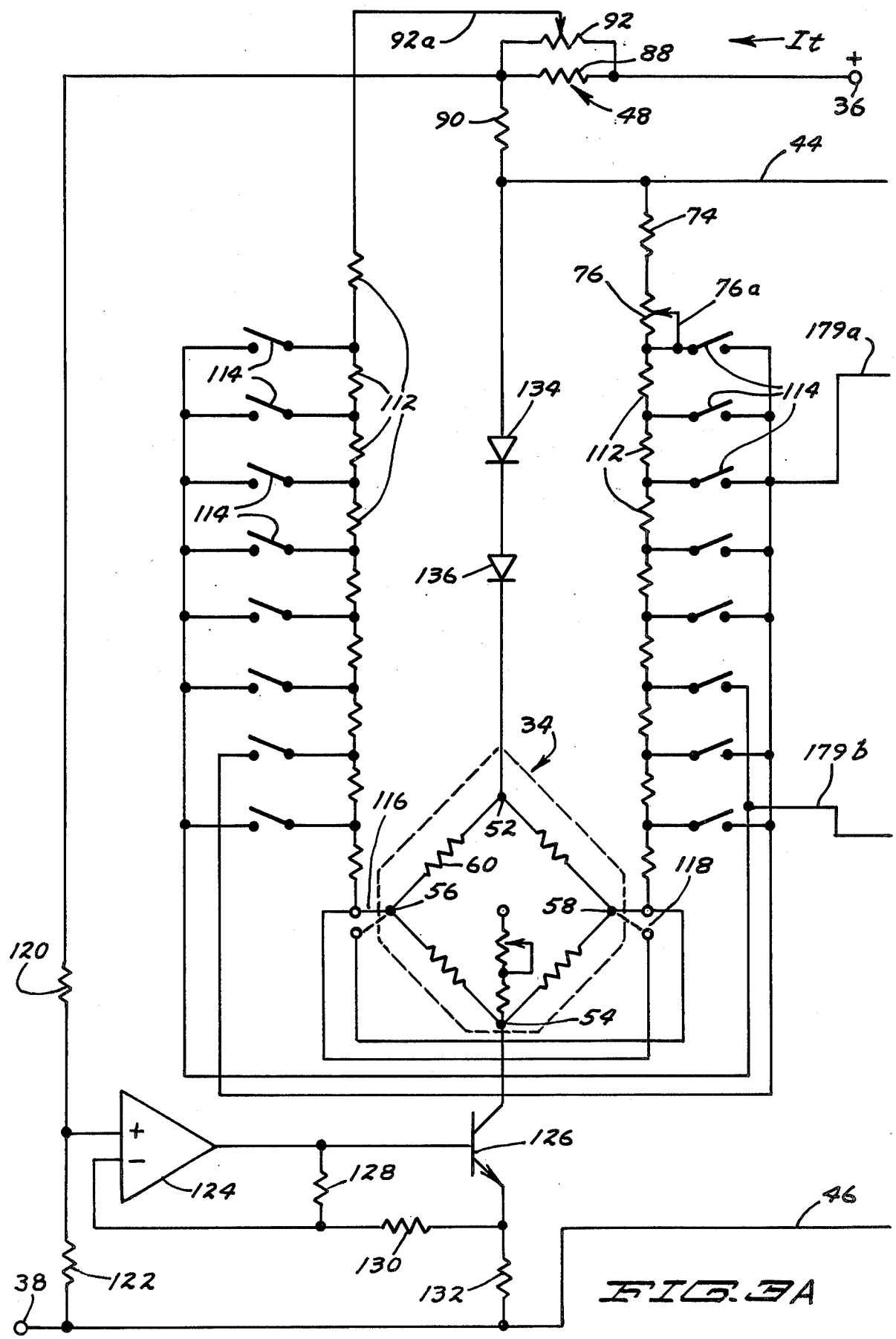
FIGS. 3A-3C are an electrical schematic diagram of another preferred embodiment of the control apparatus used in the current-to-pressure converter apparatus of FIG. 1.
Figure 3B:
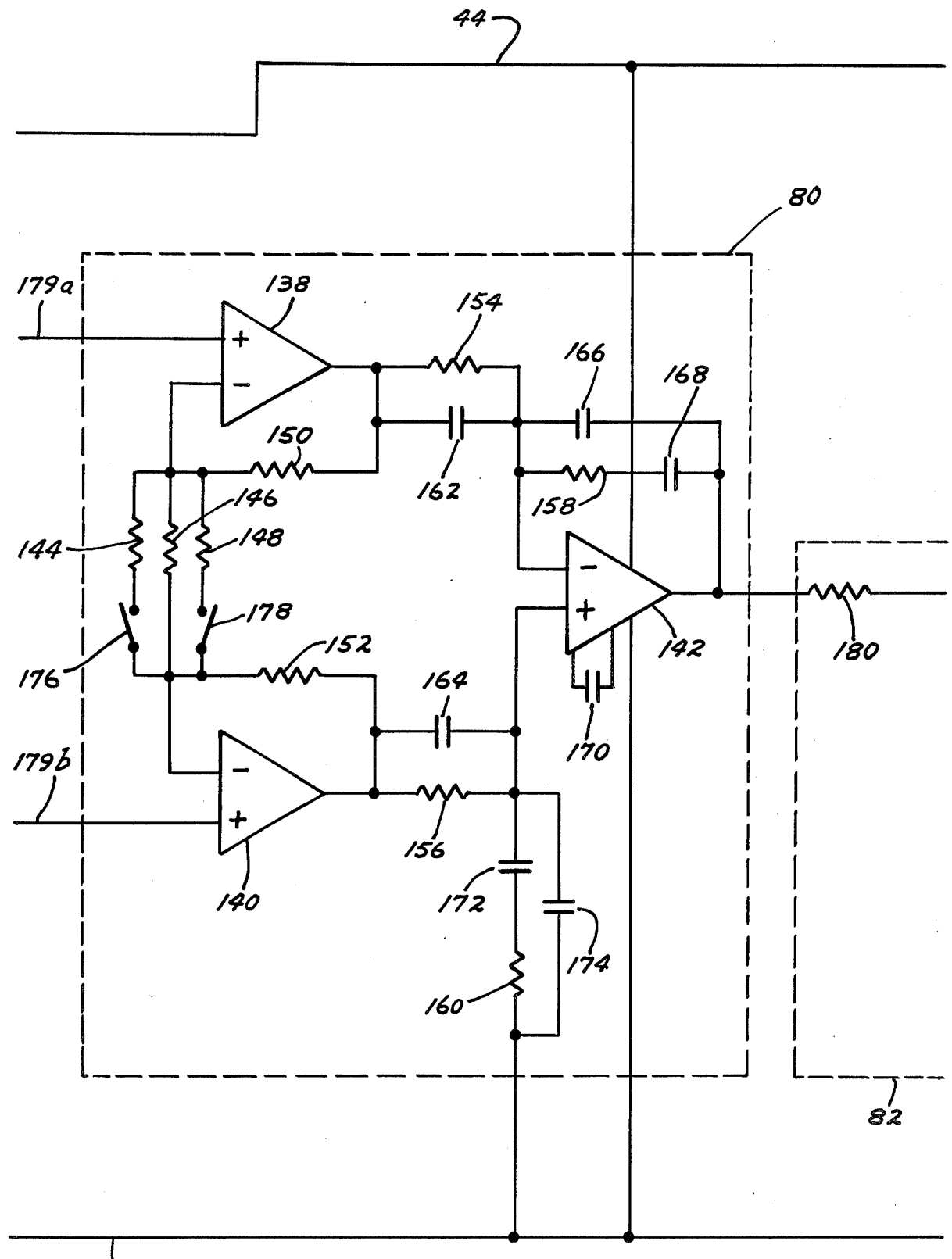
Figure 3C:
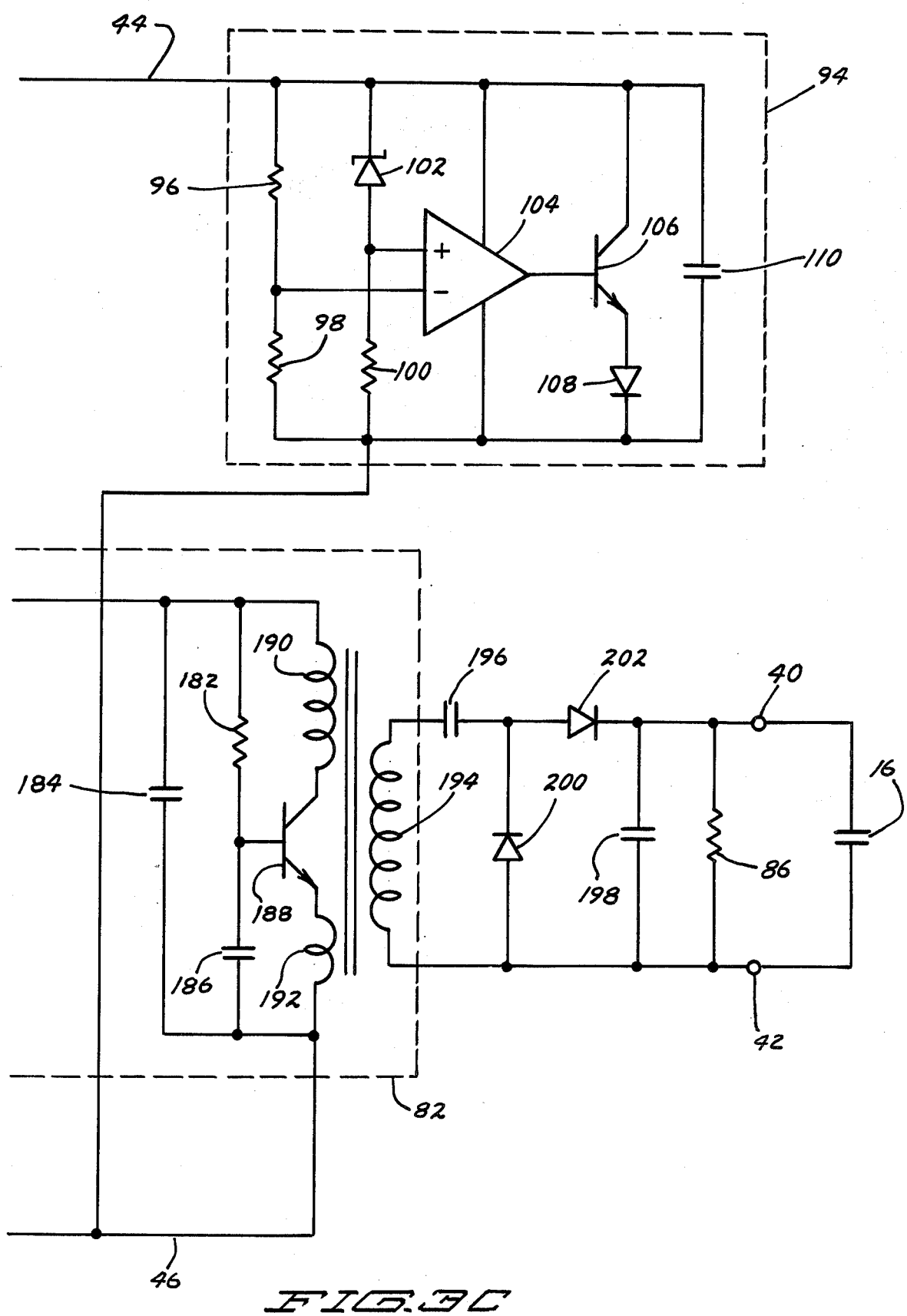

The Apparatus of FIGS. 3A-3C

FIGS. 3A-3C show another embodiment of the present invention which is generally similar to the embodiment shown in FIG. 2. In FIGS. 3A-3C, therefore, elements similar to those shown in FIG. 2 are designated with similar numerals.

In the embodiment shown in FIGS. 3A-3C, current $I_t$ is again received at input terminal 36. Connected to input terminal 36 is span adjusting means 48 which includes resistors 88 and 90 and potentiometer 92.

Voltage regulation circuit 94 is connected between first and second conductors 44 and 46. Voltage regulation circuit 94 replaces Zener diode 50 shown in the embodiment of FIG. 2 and provides greater accuracy at low input current values. In the embodiment shown in FIGS. 3A-3C, voltage regulation circuit 94 includes resistors 96, 98 and 100, Zener diode 102, amplifier 104, transistor 106 of diode 108, and capacitor 110.

A series of ranging resistors 112 and switches 1-10 are provided between wiper arm 92a of potentiometer 92 and bridge sensor 34, and between conductor 44 and bridge circuit 32. By selecting particular switches 114, the resistances connected to bridge 34 can be changed. This provides a wide variety of modes of operation with different input signal levels, and also permits range splitting.

Reversing switches 116 connected to bridge terminal 56 and 118 connected to bridge terminal 58 permit the reversal of bridge operation if desired. In FIG. 3A, the normal position of switches 116 and 118 are shown in solid line, and the reversal position, which reverses operation of the bridge, is shown in phantom lines. Such reversal also requires switching the DC feedback and the DC command signals on the lines 179a and 179b from the instrumentation amplifiers 138 and 140 to amplifiers 140 and 130, respectively.

Temperature compensation of bridge sensor 34 is provided by a temperature compensation circuit which includes a voltage divider formed by resistors 120 and 122, buffer amplifier 124, transistor 126, resistors 128, 130 and 132, and diodes 134 and 136. Transistor 126 acts as the temperature compensating element and has a very high gain. As in the embodiment shown in FIG. 2, the purpose of the temperature compensation is to maintain the output signals from the bridge circuit which are supplied to amplifier circuit 80 substantially constant despite changes in bridge characteristics due to temperature. Diodes 134 and 136 help ensure that the bridge output signals will remain constant despite the temperature compensating actions of transistor 126. The voltage characteristics of diodes 134 and 136 change in relation to temperature at the same rate as the temperature compensation of transistor 126.

Resistor 90 compensates for the non-linearity of the output of pressure sensor bridge 34 by providing a second order non-linearity compensation. The need for compensation arises since as the current through the sensor bridge 34 increases, the sensitivity of the sensor bridge 34 increases, therefore increasing the gain. Resistor 90 corrects for this second order non-linearity.

In FIG. 3B, amplifier circuit 80 includes instrumentation type amplifiers 138 and 140, error amplifier 142, resistors 144, 146, 148, 150, 152, 154, 156, 158 and 160, capacitors 162, 164, 166, 168, 170, 172 and 174, and gain selection switches 176 and 178. Switches 176 and 178 may be closed to switch in additional resistances 142 and 148 in parallel with resistor 146 to vary the gains of amplifiers 138 and 140. The output of amplifier circuit 80 slews as a function of the unbalance between the DC feedback signal received on line 179a and the DC command signal received on line 179b. This output is supplied to an oscillator circuit 82 formed by resistors 180 and 182, capacitors 184 and 186, transistor 188 and a transformer having primary windings 190 and 192, and secondary winding 194. The output of oscillator circuitry 82 is an AC signal which is a function of the voltage supplied from amplifier circuit 80. The voltage is doubled by a voltage doubler circuit including capacitors 196 and 198 and diodes 200 and 202. The output from the voltage doubler circuit is a unidirectional, rectified voltage doubled signal which is applied across output terminals 40 and 42 across the two piezoelectric plates of bimorph element 16.

The circuitry shown in FIGS. 3A-3C operates in a manner similar to the circuitry shown in FIG. 2. When the two-wire transmitter 10 (not shown in FIGS. 3A-3C) senses a change in a process parameter, it supplies a signal to process controller 12 which produces a change in the total current $I_t$ supplied to input terminal 36. This change in current $I_t$ results in a change in the DC command signal supplied on line 179b to instrumentation type amplifier 140. This in turn changes the signal supplied to the non-inverting input of error amplifier 142. The output of amplifier 142 slews as a function of the unbalance between the DC command signal and the DC feedback signal, thereby changing the output voltage applied across bimorph 16. As the position of bimorph 16 changes, it creates a change in the output pressure in line 18 shown in FIG. 1. This change in output pressure is sensed by sensor bridge 34, and results in a change in the DC feedback signal supplied on line 179a to instrumentation amplifier 138. The change in the DC feedback signal changes the signal supplied from amplifier 138 to the inverting input of error amplifier 142. The output of amplifier 142 continues to slew until balance is again restored between the DC feedback signal and the DC command signal. At that point, the output of amplifier 142 remains constant, and the position of bimorph 16 remains constant at the new established balance point.

In the preferred embodiment shown in FIG. 3B, the error signal (i.e. the difference between the DC command signal and the DC feedback signal) is amplified by the instrumentation amplifiers 138 and 140. The output is fed into the differential amplifier 142. The feedback network of resistors 158 and 160 and capacitors 166, 168, 172 and 174 operates amplifier 142 as an intergrator. This allows the loop to operate even if there is a variation in components in the rest of the loop except the pressure sensor. The integrator allows amplifier 142 to adjust its output to such a value that the error signal is equal to zero. This means that if the bimorph position changes with temperature or if the mechanical components in the pneumatic amplifier change, amplifier 142 will adjust to take care of these changes. The feedback network provides compensation such that the loop does not become unstable. Other dynamics of the loop are further compensated by adding capacitor 162 across resistor 154 and capacitor 164 across resistor 156.

Although the embodiments shown in FIGS. 1, 2 and 3A–3C has specifically shown a piezoelectric bimorph 10 as the flapper element, the present invention may also utilize a magnetically actuated flapper bar in place of the piezoelectric bimorph. In this case, the output circuitry supplies a current through a coil to provide a magnetic field which is applied to the magnetically actuated bar, rather than an output voltage between terminals 40 and 42 as illustrated in FIGS. 2 and 3. For further description of this type of embodiment refer to the before mentioned co-pending application.

The Apparatus of FIG. 4

FIG. 4 illustrates another embodiment of the present invention which utilizes a capacitive type feedback pressure sensor rather than a piezoresistive pressure or strain sensor as illustrated in FIGS. 2 and 3A–3C. As shown in FIG. 4, two-wire transmitter 10 is again connected in a series circuit with process controller 12. The output of process controller 12 is supplied as a current to servo valve 210 (which is illustrated in a schematic manner in FIG. 4) or to another suitable magnetically or electrically actuated valve. The magnitude of the current supplied by controller 14 determine the magnetic field produced by coil 212 of servo valve 210, and thereby determines the position of plunger 214. Input pressure $P_S$ is supplied to servo valve 210. The output pressure $P_{OUT}$ through output line 18 is determined by the position of plunger 214 within servo valve 210.

In the embodiment shown in FIG. 4, pressure sensor 34' is a capacitive pressure sensor which is preferably of the type described in previously-mentioned Frick U.S. Pat. No. 3,646,538. Pressure sensor 34' compares the output pressure $P_{OUT}$ with atmospheric pressure. Output lines 216 and 218 from capacitive pressure sensor 34' are supplied to a C-to-I $\alpha$ P (capacitance to current proportional) to pressure) circuit 220 within electronic controller 14. In a preferred embodiment of the present invention, C-to-I $\alpha$ P circuit 220 is of the type described in the previously mentioned Frick patent.

Controller 14 has terminals 222 and 224 connected to process controller 12. Output terminals 226 and 228 of controller 14 are connected to coil 212 of servo valve 210.

Current $I_t$ from process controller 12 is supplied to terminal 222, which is connected to first main conductor 230. A second main conductor 232 is also connected to circuit 220, and a third main conductor 234 is connected to terminal 224.

Controller 14 includes a bridge circuit formed by resistors 236, 238, 240, 242 and 244. Resistors 238 and 240 are connected in series between conductors 230 and 232. Resistor 242 is connected between conductors 232 and 234. Resistors 236 and 244 are connected between conductors 230 and 234.

Zener diode 246 establishes a reference voltage between terminals 230 and 232. The cathode of Zener diode 246 is connected to conductor 230, while its anode is connected to conductor 232.

Error amplifier 248 has its non-inverting input connected to the junction of resistors 238 and 240, and has its inverting input connected to the junction of resistors 236 and 244. The output of amplifier 248 is connected to output terminal 226. Conductors 230 and 232 are also connected to amplifier 248 to supply power.

Resistor 244 of the bridge circuit is a feedback resistor through which a feedback current proportional to pressure ($I\alpha P$) flows. Circuit 220 is connected to the junction of resistors 236 and 224 to supply the feedback current $I\alpha P$.

It can be seen, therefore, that the voltage supplied to the inverting input of amplifier 248 is a DC feedback signal which is a function of the output pressure $P_{OUT}$ sensed by capacitive pressure 34' and the current $I_t$ supplied by the process controller 12.

When a charge in current $I_t$ occurs, the DC command signal voltage supplied to the non-inverting input of amplifier 248 changes, thereby creating an unbalance between the DC command and the DC feedback signals. Amplifier 248 slews in a direction determined by the relationship of the DC command and the DC feedback signals, thereby changing the current supplied through terminals 226, 228 and coil 212 of servo valve 210. This causes a change in the position of plunger 214, thereby varying the output pressure $P_{OUT}$. This change in output pressure is sensed by capacitive pressure sensor 34', which supplies signals to circuit 220 over lines 216 and 218. The changing pressure sensed by capacitor pressure sensor 34' causes circuit 220 to change the feedback current $I\alpha P$ supplied to feedback resistor 244. This in turn changes the DC feed signal voltage supplied to the inverting input of error amplifier 248. This process continues until the DC feedback signal becomes equal to the DC command signal at the new balance point. The output of amplifier 248 then remains constant until another change in either the current $I_t$ or the feedback current $I\alpha P$ occurs.

In another embodiment similar to the embodiment shown in FIG. 4, a booster amplifier similar to booster amplifier 28 shown in FIG. 1 is connected in line 18 between servo valve 210 and pressure sensor 34'. The previously mentioned co-pending patent application includes further description of this embodiment.

Conclusion

The present invention provides important advantages over the prior art current-to-pressure transducers. In the present invention, feedback is supplied electrically, rather than by a force rebalance. Zero, span, gain and rate and reset times can all be adjusted electrically rather than mechanically. Highly accurate operation can be achieved which is limited only by the accuracy of the pressure sensor and the other electronic components. Further, the electronic, rather than mechanical feedback makes the present invention less prone to vibration than the prior art mechanical feedback converters. Finally, the present invention permits the use of existing controllers or transmitters (which have come into wide use in process control applications) to supply a control current $I_t$ which in turn controls the output pressure $P_{OUT}$.

Although the present invention has been described with reference to preferred embodiments, workers skilled in the art will recognize that changes may be made in form and detail without departing from the spirit and scope of the invention.

What is claimed is:

1. A two wire DC electrical control apparatus for providing an output fluid pressure at an output which is a function of a magnitude of a variable input DC current, and which is energized solely by the variable input DC current the apparatus comprising:
   first and second terminals adapted to be connected in a circuit through which the variable input DC current flows, and wherein the control apparatus is energized solely by the variable input DC current flowing between the first and second terminals;
   first and second conductors connected to the first and second terminals, respectively;
   voltage regulating means connected between the first and second conductors for deriving from the variable input DC current a regulated DC voltage;
   means for providing a DC electrical command signal having a magnitude which is a function of the magnitude of the variable input DC current and the regulated DC voltage;
   means for providing the output fluid pressure at the output as a function of a magnitude of a DC electrical control signal;
   means powered by the regulated DC voltage for providing the DC control signal with a magnitude which is a function of the magnitude of a DC command signal and a magnitude of a DC feedback signal, wherein the means for providing the DC control signal adjusts the magnitude of the DC control signal when the magnitudes of the DC command signal and the DC feedback signal do not have a predetermined relationship, and causes the magnitude of the DC control signal to remain constant when the magnitudes of the DC command signal and the DC feedback signal have the predetermined relationship; and
   pressure transducer means powered by the regulated DC voltage and being connected directly to the output fluid pressure at the output and electrically coupled to the means for providing the DC control signal for providing the DC electrical feedback signal with a magnitude which is a function of the output fluid pressure and the regulated DC voltage.

2. The control apparatus of claim 1 wherein the means for providing the output fluid pressure comprises:
   a nozzle;
   means for providing fluid pressure to the nozzle;
   an electrically controllable flapper element having one end proximate the nozzle and being movable as a function of the DC control signal, wherein the position of the flapper element is a function of the magnitude of the DC control signal and determines an amount of fluid escaping from the nozzle; and
   means connected between the nozzle and the output for providing the output fluid pressure as a function of the amount of fluid escaping from the nozzle.

3. The apparatus of claim 2 wherein the flapper element is a piezoelectric bimorph which bends as a function of magnitude of a DC drive voltage and further comprising DC-to-DC converter means for converting the DC electrical control signal to the DC drive voltage which is greater in magnitude and proportional to the DC control signal.

4. The control apparatus of claim 1 wherein the pressure transducer means comprises a piezoresistive sensor bridge having first, second, third and fourth bridge terminals.

5. The control apparatus of claim 4 and further comprising:
   temperature compensation means connected in a series current path with the first and second bridge terminals for compensating for variations in electrical output of the piezoresistive sensor bridge due to temperature variation.

6. The control apparatus of claim 4 and further comprising:
   gain compensation means connected in the series current path with the first and second bridge terminals for compensating for variations in the electrical output of the piezoresistive sensor bridge due to variation in the variable input DC current.

7. The control apparatus of claim 4 and further comprising:
   means connected to the fourth bridge terminal for providing the DC feedback signal; and
   wherein the means for providing a DC command signal is connected to the third bridge terminal.

8. The control apparatus of claim 7 and further comprising span adjusting means connected between the first terminal and the first conductor.

9. The control apparatus of claim 8 wherein the means for providing a DC command signal is connected between the third bridge terminal and the span adjusting means.

10. The control apparatus of claim 9 and further comprising means connected between the fourth bridge terminal and the first conductor for providing the DC feedback signal.

11. The control apparatus of claim 10 and further comprising:
    zero adjust means connected in series with the means for providing the DC feedback signal between the first conductor and the fourth bridge terminal.

12. A signal converting unit intended to be incorporated in a pneumatic control system and used to convert a DC current which varies in magnitude within a predetermined range and which is received at the input of the unit into a pneumatic signal which is emitted at the output of the unit and the value of which should be a linear function of the magnitude of the DC current, the unit being energized solely by the DC current, the unit comprising: a tongue-shaped piezoelectric element which is loaded with a variable DC drive voltage having a magnitude which depends on the magnitude of the DC current so that the element carries out a lateral bending movement which varies with the magnitude of the variable DC drive voltage, a pneumatic line with a chamber which is supplied with compressed air via a throttle and from which the compressed air is conducted through a nozzle located near to one side of the piezoelectric element so that the air present in the chamber is regulated by the piezoelectric element as a function of the variable DC drive voltage, an outlet line leading from the chamber for transmitting to the control system the regulated air pressure as the pneumatic signal, voltage regulating means for deriving a regulated DC voltage from the DC current which does not vary despite variations in the magnitude of the DC current within the predetermined range, a pressure transducer powered by the regulated DC voltage and connected to the outlet line for providing an electrical DC feedback signal corresponding to the regulated air pressure, means for producing a DC command signal which is a function of the magnitude of the DC current, a circuit which receives both the DC command signal and the electrical DC feedback signal, and which has a device for forming a difference signal by comparing the two signals, a device for integrating the difference signal and a DC-to-DC converter for thereafter producing from the integrated difference signal the variable DC drive voltage with which the piezoelectric element is loaded, the magnitude of the variable DC drive voltage being greater than and proportional to a magnitude of the integrated difference signal, the pneumatic signal to the control system accurately following the magnitude of the DC current.

13. A two wire DC electrical control apparatus for providing an output fluid pressure at an output which is a function of a magnitude of a variable input DC current, and which is energized solely by the variable input DC current the apparatus comprising:

first and second terminals adapted to be connected in a circuit through which the variable input DC current flows, and wherein the control apparatus is energized solely by the variable input DC current;

voltage regulating means connected in a circuit between the first and second terminals for deriving a regulated DC voltage from the variable input DC current;

means for providing a DC command voltage which is a function of the magnitude of the variable input DC current;

a nozzle;

means for providing fluid pressure to the nozzle;

an electrically controllable piezoelectric flapper element having one end proximate the nozzle and being movable in response to a DC drive voltage wherein the position of the flapper element is a function of a magnitude of the DC drive voltage and determines an amount of fluid escaping from the nozzle;

means connected to the nozzle and the output for providing the output fluid pressure as a function of the amount of fluid escaping from the nozzle;

a piezoresistive sensor bridge pressure transducer powered by the regulated DC voltage and connected directly to the output fluid pressure at the output for providing a DC feedback voltage having a magnitude which is a function of the output fluid pressure and the regulated DC voltage;

means for providing a DC control voltage with a magnitude which is a function of the DC command voltage and the DC feedback voltage, wherein the means for providing the DC control voltage adjusts the magnitude of the DC control voltage when the DC command voltage and the DC feedback voltage do not have a predetermined relationship, and causes the magnitude of the DC control voltage to remain constant when the DC control voltage and the DC feedback voltage have the predetermined relationship; and DC-to-DC converter means for converting the DC control control voltage to the DC drive voltage, the magnitude of the DC drive voltage being greater than and proportional to the magnitude of the DC control voltage.

14. The control apparatus of claim 13 and further comprising:

temperature compensation means connected in circuit with the piezoresistive sensor bridge for compensating for variations in electrical output of the piezoresistive sensor bridge due to temperature variation;

span adjusting means connected in circuit with the piezoresistive bridge for adjusting span of the control apparatus; and zero adjust means connected in circuit with the piezoresistive sensor bridge for adjusting a zero point of the control apparatus.

* * * * *

UNITED STATES PATENT AND TRADEMARK OFFICE
CERTIFICATE OF CORRECTION

PATENT NO. : 4,481,967

DATED : November 13, 1984

INVENTOR(S) : Roger L. Frick

It is certified that error appears in the above-identified patent and that said Letters Patent is hereby corrected as shown below:

Column 1, line 24, "456" should be --546--.

Column 1, line 28, "in" should be --to--.

Column 1, line 36, "2,930,430" should be --2,939,430--.

Column 4, line 25, "potentiometer 78" should be --potentiometer 76--.

Column 4, line 40, "resistor 80" should be --resistor 86--.

Column 5, line 27, "sensitivy" should be --sensitivity--.

Column 5, line 61, "switches 1-10" should be --switches 114--.

Column 7, line 37, "has" should be --have--.

Column 7, line 38, "10" should be --16--.

Column 8, line 4, ")" after "proportional" should be deleted.

Column 8, line 43, "charge" should be --change--.

Signed and Sealed this

Fifteenth Day of October 1985

[SEAL]

Attest:

*Attesting Officer*

DONALD J. QUIGG

*Commissioner of Patents and Trademarks—Designate*